(12) United States Patent
Stoess et al.

(10) Patent No.: US 6,834,320 B1
(45) Date of Patent: Dec. 21, 2004

(54) OPTIMIZED BUS CONNECTION FOR MANAGING BUS TRANSACTIONS

(75) Inventors: Annie Stoess, Bad Aibling (DE); Johann Schachtner, Putzbrunn (DE); Wolfgang Ziemann, Hoehenkirchen-Siegertsbrunn (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 09/926,067

(22) PCT Filed: Feb. 1, 2000

(86) PCT No.: PCT/DE00/00276

§ 371 (c)(1),
(2), (4) Date: Aug. 23, 2001

(87) PCT Pub. No.: WO00/52589

PCT Pub. Date: Sep. 8, 2000

(30) Foreign Application Priority Data

Feb. 26, 1999 (DE) .......................... 199 08 414

(51) Int. Cl.⁷ .............................................. G06F 13/00
(52) U.S. Cl. ....................................... 710/310; 710/306
(58) Field of Search ................................ 710/107, 306, 710/310, 311

(56) References Cited

U.S. PATENT DOCUMENTS 5,535,345 A * 7/1996 Fisch et al. ................. 710/305
5,835,739 A    11/1998 Bell et al.
6,012,118 A * 1/2000 Jayakumar et al. .......... 710/107
6,175,889 B1 * 1/2001 Olarig ........................ 710/309
6,618,782 B1 * 9/2003 Gulick et al. ................ 710/305

FOREIGN PATENT DOCUMENTS

DE    31 40 310    4/1983

OTHER PUBLICATIONS

A. Grbic, et al., Proceedings of the 35rd DAC, pp. 66–69, "Design and Implementation of the NUMAchine Multiprocessor", 1998.

C. Brendan, et al., Technical Report MS–CIS–93–43, pp. 1–14, "Host Interfacing at a Gibabit", Apr. 21, 1993.

* cited by examiner

Primary Examiner—Glenn A. Auve
(74) Attorney, Agent, or Firm—Cohen, Pontani, Lieberman & Pavane

(57) ABSTRACT

For optimization of the mode of operation of processor systems, there is proposed a bus connection which divides bus transactions substantially into transactions that must be executed in strictly logical sequence and that do not have to be executed in strictly logical sequence. Subsequently the transactions are again arrayed one after another in serial manner for further processing, with the feature that, in given cases, transactions that do not have to be executed in strictly logical sequence are moved ahead of transactions that must be executed in strictly logical sequence. The result is a gain in time and thus performance for the processor system.

8 Claims, 1 Drawing Sheet

OPTIMIZED BUS CONNECTION FOR MANAGING BUS TRANSACTIONS

RELATED APPLICATIONS

This is a U.S. national stage of International application No. PCT/DE00/00276 filed 1 Feb. 2000.

This patent application claims priority of German Patent Application No. 19908414.9 filed 26 Feb. 1999, the disclosure of which is hereby incorporated by reference.

BACKGROUND OF THE INVENTION (1) Field of the Invention

The invention relates to an optimized bus connection for acceptance of bus transactions.

(2) Description of Related Art

The most diverse bus transactions take place in a processor system. Such bus transactions can be classified as those transactions which must be executed in a strictly logical sequence, and can be classified as those transactions which do not have to be executed in a strictly logical sequence.

Bus connections provided with a temporary store operating according to the FIFO principle are known for acceptance of bus transactions. In the temporary store operating according to the FIFO principle, bus transactions are temporarily stored in the sequence of their arrival in the sequence of their arrival and subsequently read out and executed in corresponding sequence, regardless of whether they must be or do not have to be executed in strictly logical sequence.

During bus transactions, it is frequently necessary to wait for results of other bus transactions, for example in order to be able to operate further with updated parameters. Because of the circumstance that the bus transactions are executed in the sequence of arrival, bus transactions which are independent of such transactions must nevertheless wait until the transactions that arrived earlier have been completed. The overall result is slowing and thus loss of performance of the processor system.

SUMMARY OF THE INVENTION

One object of the present invention is to provide an optimized bus connection, by which the working speed of a processor system is accelerated and thus its performance capability is increased.

This and other objects are attained in accordance with one aspect of the invention directed to an optimized bus connection for acceptance of bus transactions, provided with a first store operating according to a FIFO principle, in which bus transactions arriving from a higher-level processor system for execution by the optimized bus connection are temporarily stored in their sequence of arrival. A first functional section is coupled to an output of the first store for classifying the bus transactions temporarily stored in the first store, and including means for classifying those transactions that must be executed in a strictly logical sequence as a first class of transactions, and those transactions that do not have to be executed in a strictly logical sequence as a second class of transactions. A second functional section is coupled to an output of the first functional section and comprises at least first and second functional lines disposed in parallel, wherein the first functional line is allocated to the first class of transactions, and is provided with a storage structure functioning according to the FIFO principle, and wherein the second functional line is allocated to the second class of transactions, and has a storage structure suitable for random accesses. A third functional section, with an execution unit, is coupled to the functional lines of the second functional section, and comprising means for organizing the transactions allocated to the at least first and second function lines of the second functional section into a serial sequence for forwarding to the higher-level processor system, wherein the organizing means of the execution unit moves a transaction of the second class ahead of a transaction of the first class, depending on a state of the higher-level processor system.

Such a bus connection classifies and typifies the arriving bus transactions and allocates them to respective functional lines disposed in parallel. Depending on the class or type of a transaction, the transactions are temporarily stored in the various functional lines in such a way that, on the one hand, they can be treated according to their class or type and, on the other hand, they are sufficiently separated from one another that an adapted sequence can be selected in the sequence of execution. Contributing to this is the fact that some functional lines have a parallel structure. Thus transactions can be moved to the front with the inventive bus connection, so that waiting times until completion of a previously arrived transaction can be eliminated in many cases. The result is acceleration of the mode of operation and thus increased performance capability of a processor system.

Accordingly, not only are transactions pending for execution separated according to whether or not they must be executed according to a strictly logical sequence, but also the transactions that do not have to be executed strictly according to a logical sequence are further separated according to whether they are transactions of the read or write type. Read transactions in particular are determining for the performance of an overall system. They must therefore be given special priority in execution.

As explained in the foregoing, the inventive bus connection eliminates congestion effects which can occur among transactions pending for execution. In the absence of congestion effects, it is possible that entire functional lines will remain almost empty, because arriving transactions can be executed immediately. In order to save further on time needed to transport transactions through the so-called empty functional lines, advantageous embodiments of the invention are provided with shortcuts which bypass the so-called empty functional lines.

DETAILED DESCRIPTION OF THE DRAWING

Figure 1:
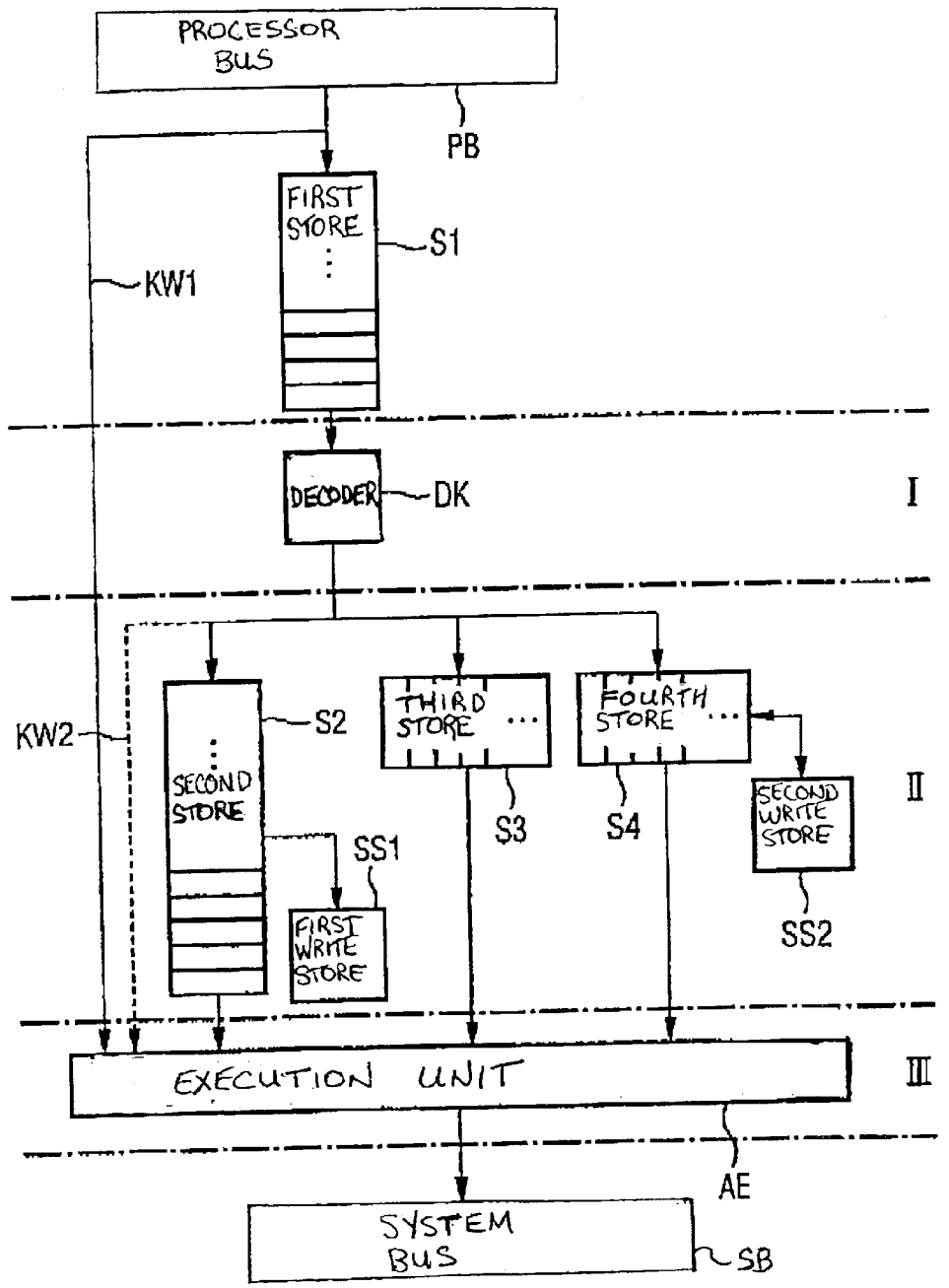
FIG. 1 is schematic block diagram showing one embodiment of an optimized bus connection constructed in accordance with the present invention.

The FIGURE shows a processor bus PB, which is part of a higher-level processor system, not indicated in more detail in the FIGURE.

To processor bus PB there is connected a first store S1, which is known in itself and operates as a temporary store according to the FIFO principle, and which stores the arriving bus transactions in their sequence of arrival.

Following first store S1, there are provided three functional sections I, II and III connected in series, of which first functional section I is responsible for reading out, classifying and typifying, by means of a decoder DK, as fast as possible, the transactions temporarily stored in first store S1. On the basis of the classification, the transactions are classified into those transactions that must be executed in strictly logical sequence. In addition, the transactions are classified into those transactions that do not have to be executed in strictly logical manner. Within the group of transactions that do not have to be executed in strictly logical sequence, a deeper-level typification is performed as to whether the transactions are transactions of the read type or write type.

Second functional section 11 receives, according to typification and classification, in one of three further stores including second store S2, third store S3, and fourth store S4, each of which is disposed in its own allocated functional line, the transaction processes typified and classified by decoder DK.

The transactions classified in the "execution in strictly logical sequence" class are received in second store S2 regardless of whether they correspond to the "write" or "read" type. Since these transaction processes must be executed in strictly logical sequence, a deeper-level subdivision into such types is not useful.

Transactions which correspond to the "write" type have allocated to a first write store SS1, in which the information bits to be written can be received. If an individual processor connected to processor bus PB starts a transaction process of the "execution in strictly logical sequence" class and of the "write" type, it transfers the corresponding transaction process together with the information bits to be written to first functional section I. In this way the transaction process for the individual processor is ended. It can be devoted to other tasks. First functional section I ensures that the transaction process is written into second store S2 and the information bits to be written are written into first write store SS1, each of second functional section II. Second store S2 is designed according to the FIFO principle, in order to be able thereby to maintain the strictly logical sequence of execution of the transaction processes.

In the present practical example, transaction processes of the "execution not in strictly logical sequence" class and of the "read" type are stored in third store S3 of second functional section II. Since the sequence of execution is unrestricted, third store S3 is designed according to a parallel structure, from which contents can be extracted optionally. The same is true for fourth store S4 of second functional section II, only in regard to the "write" type with the "execution not in strictly logical sequence" transaction class. Since fourth store S4 is responsible for transaction processes of the "write" type, a second write store SS2 is allocated to this store in a manner corresponding to first write store SS1.

Third store S3 and fourth store S4 ensure that, in particular, the transactions of the "execution not in strictly logical sequence" class and of the "read" type can be executed immediately and the transaction process of the "execution not in strictly logical sequence" class of the "write" type can be executed as soon as possible.

The components of second functional section II allocated to respective functional lines lead to an execution unit AE which is common to the functional lines of second functional section II and which is disposed in third functional section III. With the transactions obtained from the functional lines of second functional section II, execution unit AE provides for serial sequencing for further processing, while taking into consideration the importance of the origin of the transactions from the functional lines. In this way, transactions of the "execution not in strictly logical sequence" class may be moved ahead of transactions of the "execution in strictly logical sequence," class. The transactions rearranged in more favorable sequence in this way are then forwarded to a system bus SB, which is also part of the higher-level processor system not indicated in more detail in the FIGURE.

Shortcuts KW1 and KW2 permit the transaction processes to jump over individual functional sections. For example, if the successive components of functional sections I and II are empty, a transaction process can travel directly from processor bus PB via shortcut KW1 into execution unit AE of functional section III. If second store S2 operating according to the FIFO principle in functional section II is empty, an arriving transaction process can be transferred immediately through the store and directed to execution unit AE of functional section III. In both cases, time is saved for transaction processes which affect through transport.

What is claimed is:

1. An optimized bus connection for acceptance of bus transactions, provided with a first store operating according to a FIFO principle, in which bus transactions arriving from a higher-level processor system for execution by the optimized bus connection are temporarily stored in their sequence of arrival, the optimized bus connection comprising:

a first functional section coupled to an output of the first store for classifying the bus transactions temporarily stored in the first store, and including means for classifying those transactions that must be executed in a strictly logical sequence as a first class of transactions, and those transactions that do not have to be executed in a strictly logical sequence as a second class of transactions, a second functional section coupled to an output of said first functional section and comprising at least first and second functional lines disposed in parallel, wherein said first functional line is allocated to the first class of transactions, and is provided with a storage structure functioning according to the FIFO principle, and wherein said second functional line is allocated to said second class of transactions, and has a storage structure suitable for random accesses, and a third functional section with an execution unit coupled to the functional lines of the second functional section, and comprising means for organizing the transactions allocated to said at least first and second functional lines of the second functional section into a serial sequence for forwarding to the higher-level processor system, wherein the organizing means of said execution unit moves a transaction of the second class ahead of a transaction of the first class, depending on a state of the higher-level processor system.

2. An optimized bus connection according to claim 1, wherein, the second class of transactions includes read and write types, the first functional section typifies the bus transactions temporarily stored in the first store, and the second functional section includes a respective one of said at least first and second functional lines for each of said types.

3. An optimized bus connection according to claim 2, wherein a first shortcut bypasses said first store, said first functional section and said second functional section so that bus transactions arrive at the execution unit of the third functional section from the higher-level processor system by means of said first shortcut which operates on condition that an empty state exists in the first and second functional sections.

4. An optimized bus connection according to claim 3, wherein a second shortcut bypasses said first functional line so that at least one transaction of the first class of transactions arrives at the execution unit of the third functional section from the first functional section by means of said second shortcut which operates on condition that an empty state exists in the first functional line.

5. An optimized bus connection according to claim 2, wherein a second shortcut bypasses said first functional line so that at least one transaction of the first class of transactions arrives at the execution unit of the third functional section from the first functional section by means of said second shortcut which operates on condition that an empty state exists in the first functional line.

6. An optimized bus connection according to claim 1, wherein a first shortcut bypasses said first store, said first functional section and said second functional section so that bus transactions arrive at the execution unit of the third functional section from the higher-level processor system by means of said first shortcut which operates on condition that an empty state exists in the first and second functional sections.

7. An optimized bus connection according to claim 6, wherein a second shortcut bypasses said first functional line so that at least one transaction of the first class of transactions arrives at the execution unit of the third functional section from the first functional section by means of said second shortcut which operates on condition that an empty state exists in the first functional line.

8. An optimized bus connection according to claim 1, wherein a second shortcut bypasses said first functional line so that at least one transaction of the first class of transactions arrives at the execution unit of the third functional section from the first functional section by means of said second shortcut which operates on condition that an empty state exists in the first functional line.

* * * * *